(12) United States Patent
Jurgens et al.

(10) Patent No.: US 7,208,107 B2
(45) Date of Patent: Apr. 24, 2007

(54) METHOD AND DEVICE FOR PRODUCING SPHERICAL PARTICLES FROM A POLYMER MELT

(75) Inventors: Theodor Jurgens, Catrop-Rauxel (DE); Rudolf Geier, Essen (DE)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 11/085,929

(22) Filed: Mar. 21, 2005
 (Under 37 CFR 1.47)

(65) Prior Publication Data
 US 2006/0082007 A1   Apr. 20, 2006

Related U.S. Application Data

(63) Continuation of application No. 10/356,330, filed on Jan. 31, 2003, now abandoned, which is a continuation of application No. PCT/EP01/00518, filed on Jan. 18, 2001.

(30) Foreign Application Priority Data
 Aug. 29, 2000 (DE) .............................. 100 42 476

(51) Int. Cl.
 *B29B 9/00* (2006.01)
(52) U.S. Cl. .................. 264/9; 264/14; 425/6
(58) Field of Classification Search ............ 264/9, 264/14; 425/6
 See application file for complete search history.

(56) References Cited

U.S. PATENT DOCUMENTS

| 2,714,224 | A | | 8/1955 | Schaub et al. |
| 2,968,833 | A | * | 1/1961 | De Haven et al. ............. 264/9 |
| 3,071,804 | A | * | 1/1963 | Meek ........................ 264/14 |
| 3,274,642 | A | * | 9/1966 | Cramer ........................ 425/6 |
| 3,544,525 | A | | 12/1970 | Balint et al. |
| 5,766,521 | A | | 6/1998 | Le Thiesse et al. ............ 264/7 |
| 6,689,464 | B1 | * | 2/2004 | Lanze et al. ............... 428/402 |
| 2002/0056931 | A1 | * | 5/2002 | Zardi et al. ................. 264/13 |

FOREIGN PATENT DOCUMENTS

| DE | 198 01 832 A1 | 7/1999 |
| DE | 198 49 485 A1 | 5/2000 |
| EP | 0 880 995 A2 | 12/1998 |
| GB | 1 251 093 A1 | 10/1971 |

* cited by examiner

*Primary Examiner*—Mary Lynn Theisen
(74) *Attorney, Agent, or Firm*—Darby & Darby

(57) ABSTRACT

The invention relates to a method and a device for the production of spherical particles, whereby a molten prepolymer or precondensate is transformed into droplets by means of a drip nozzle, the droplets are subjected to a countercurrent with a gas in a precipitation column until at least partial crystallization is achieved and are then subjected to an additional post-crystallization phase. In order to economically produce higher quality particles at a high flow rate, the molten prepolymer is transformed into droplets by means of a vibrating nozzle plate and/or direct vibration of the molten prepolymer or polymer and resulting droplets are subjected to an air and gas countercurrent.

34 Claims, 1 Drawing Sheet

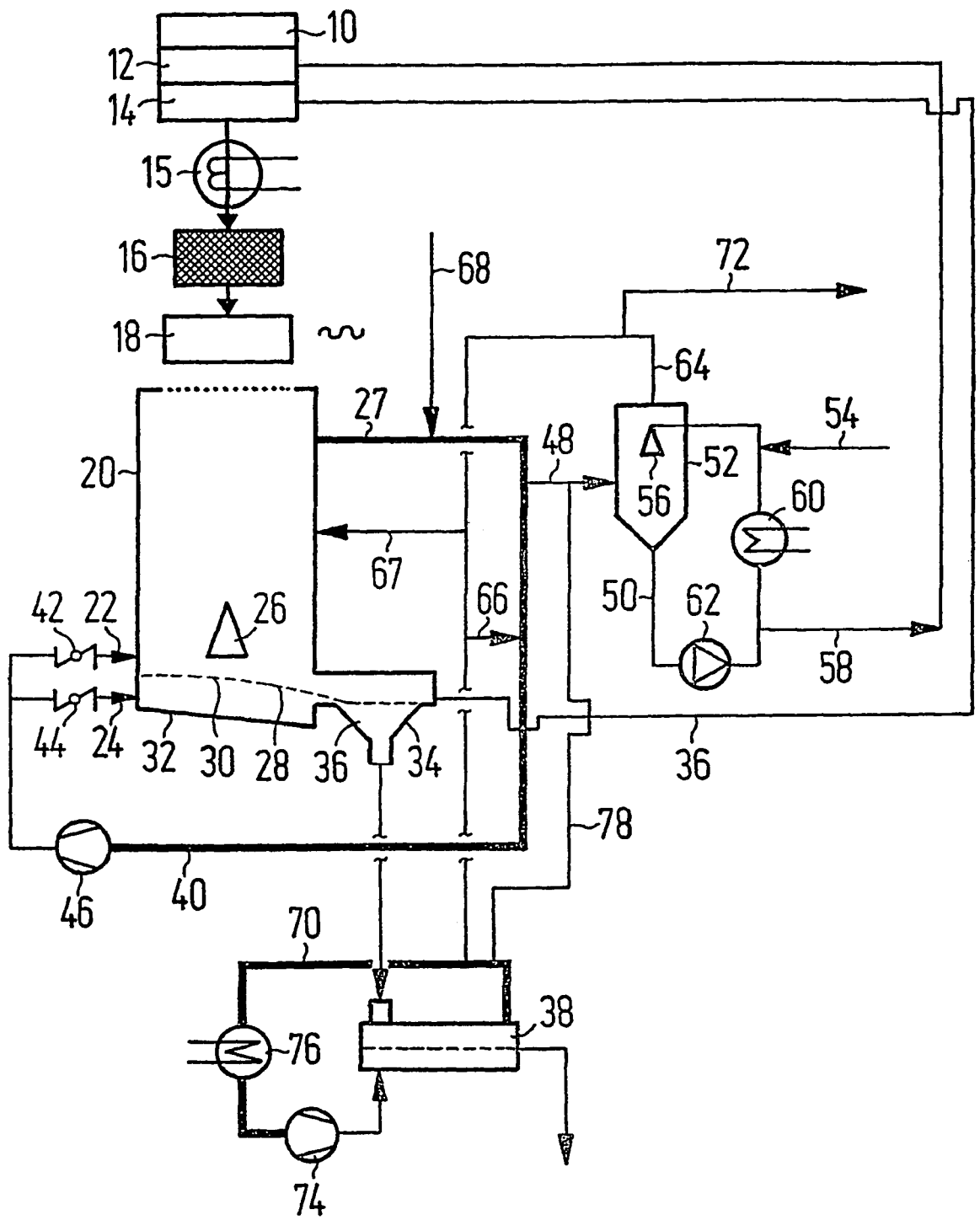

METHOD AND DEVICE FOR PRODUCING SPHERICAL PARTICLES FROM A POLYMER MELT

This application is a continuation of a PCT continuation, application Ser. No. 10/356,330, filed on Jan. 31, 2001, now abandoned which in turn is a continuation of PCT/EP 01/00518, which was filed on Jan. 18, 2001 and published on Mar. 7, 2002 under Publication No. WO02/18113. PCT/EP0100518 claims priority to German Application Ser. No. 100 42 476.7 filed on Aug. 29, 2000.

The present invention relates to a method of producing spherical particles from a prepolymer and/or polymer melt, particularly made of polyfunctional carboxylic acids and alcohols, such as PET or PBT particles, the polymer melt being dripped into droplets using a drip nozzle, the droplets having a gas applied to them in counterflow in a fall tower for at least partial crystallization, and the droplets then preferably being transported to a polycondensation stage. Furthermore, the present invention relates to a device for producing spherical particles from a prepolymer and/or polymer, particularly made of polyfunctional carboxylic acids and alcohols, such as PET or PBT particles, including at least one nozzle device which drips molten prepolymer and/or polymer, a fall tower downstream thereto, which is positioned in a gas loop via at least one gas intake opening at the floor and least one gas outlet opening at the nozzle device, a transport device positioned in the fall tower for particles which are at least precrystallized in the fall tower, and a crystallization stage downstream from the transport device.

To produce PET granulate, supplying a precondensate, after the esterification and/or reesterification and pre-polycondensation of ethylene glycol and/or butane diol in the PBT process, and terephthalic acid to a reactor which has a partial vacuum applied to it is known. In this way, the viscosity of the largely liquid and short-chain polymer is increased, and liberated ethylene glycol and/or butane diol is returned to the esterification and/or reesterification. After the reactor treatment, the polycondensate is cooled in water and cut into granulate, in order to obtain cylindrical pellets which are largely amorphous. However, there is the disadvantage that the ends have projections which break off and may therefore lead to the production of dust. This known method also has the disadvantage that the pellets are in a largely amorphous state after their granulation, which requires a partial crystallization in a subsequent separate treatment stage. Furthermore, the outlay for the facility and energy is a problem, since separate treatment stages, such as a reactor stage having a partial vacuum applied to it and partial crystallization, are necessary.

In order to avoid these disadvantages, it is suggested in German Patent Application 198 49 485 A1 that molten precondensate be supplied to a fall tower having a distributor drip nozzle in the head region, the precondensate emitted from the distributor drip nozzle being subjected in the fall tower to an inert gas such as nitrogen in counterflow. In this way, the falling speed is reduced, with simultaneous acceleration of crystallization of the droplets. The particles arising on the floor of the fall tower may then be supplied as dried and partially crystallized pellets to polycondensation and/or SSP.

In order to produce spheres of uniform geometry made of plastic, it is suggested according to German Patent 43 38 212 C2 that plastic in a molten consistency be dripped from a nozzle device by exciting vibrations, the droplets produced in this way being cooled in a liquid.

The present invention is based on the problem of refining a method and the device of the type initially cited in such a way that spheres, made of polymers, having a desired size and uniform geometry may be produced at a large scale. Simultaneously, the production of the particles is to be energetically more favorable and have a simpler facility and therefore be more cost-effective. Furthermore, more rapid melting of the spheres is to be possible.

According to the present invention, the problem is solved by a method of the type initially cited essentially in that the prepolymer and/or polymer melt is dripped, by a nozzle plate excited into vibration and/or by exciting vibrations of the prepolymer and/or polymer melt itself, into droplets, which have air applied to them as the gas in counterflow, the air being supplied to the fall tower at a temperature such that the air is heated to at most a temperature $T_1$ of $T_1 \leq 160°$ C. through heat transfer from the droplets. The air is particularly supplied at a temperature $T_2$ of $T_2 \leq 150°$ C., particularly $T_2 \leq 110°$.

For the production of PBT spheres, the air is to be heated to at most a temperature $T_1$ of $T_1 \leq 140°$ C. In this case, air is supplied at a temperature $T_2$ of $T_2 \leq 130°$ C., particularly $T_2 \leq 80°$ C. However, the air is preferably supplied to the fall tower at a temperature $T_1$ which lies above the glass transition point of the polymer to be dripped.

Furthermore, the air is introduced in the lower region of the fall tower, particularly in the floor region, in such a way that air flows against the droplets in the lower region of the fall tower at a higher speed than in the upper region.

Independently of this, the air intake temperature is to be set in such a way that oxidative damage of the dripped polymer is avoided and sufficient solidification and/or precrystallization is provided.

In order that the air entering the fall tower may absorb reaction substances such as ethylene glycol and/or butane diol or water to a sufficient extent, the air is to have a low dew point upon entering the fall tower, preferably in the range between –10° C. and –40° C.

In order to be able to separate and reuse reaction products dissolved in the air flowing through the fall tower, a refinement of the present invention provides that a portion—approximately 10%–30%—of the air flowing through the loop is removed and supplied to a spray loop, in which the reaction products are removed. In particular, fresh and cold ethylene glycol and/or butane diol are sprayed in the purification loop, through which reaction substances such as ethylene glycol and/or butane diol, oligomers, and water, which are diffused in the dry air, condense out of the air loop and may be reused as valuable raw materials, for example, the ethylene glycol and/or butane diol for esterification for the process using TPA and/or for reesterification for a process using DMT. The air purified in this way retains its low dew point and may again be supplied to the loop flowing through the fall tower.

To remove acetaldehyde and/or THF (tetrahydrofuran) in the PBT process, which may not be removed in a corresponding ethylene glycol and/or butane diol spray loop, a quantity of the intake air charged with acetaldehyde is mixed into a heat transfer facility such as a furnace and thus combusted. The combusted quantity of air is constantly, particularly continuously, replaced by an equal quantity of air. In this way, the need for combustibles such as heating gas and/or oil is reduced.

A downstream precrystallization stage, which is particularly important in the processing of comonomers and which is also operated using dry air, may also be included in the purification loop.

Since the polymer melt, which is not stringy, and/or the precondensate is dripped by a nozzle plate set into vibration, uniform and identically sized and/or identically shaped droplets result. These droplets first fall through a region of the fall tower in which there is an essentially laminar flow. Therefore, sufficient external solidification of the droplets may occur, so that the danger of collision is minimized, through which otherwise agglutination of droplets would occur.

Instead of excitation of vibration of the nozzle plate, or as a supplement thereto, the prepolymer and/or polymer melt may be excited into vibration and dripped using a vibration generator, for example.

Furthermore, the fall tower has a cross-section, particularly a diameter, which is significantly larger than the nozzle plate in regard to an area, essentially the circular area on which the outlet openings for dripping the prepolymer and/or polymer melt are positioned. Furthermore, the inner wall of the fall tower is to be made of a material and/or be coated with a material which prevents and/or hinders adhesion of droplets. Teflon® is an example of a suitable material.

In order to additionally increase the dwell time of the droplets, which are formed in a spherical shape, an increase of the air speed is caused by baffles in the fall tower. The baffles lead to a change in cross-section of the fall tower and therefore to a corresponding change of the air speed.

At the floor of the fall tower, the particles are guided via a surface, which has openings, to a separating device such as an oversize separator, in which possible agglomerates are sorted out and supplied to the starting melt and/or its pre-products. Since the corresponding agglomerated particles still have a slight viscosity, rapid and good dissolving in a precondensation stage is possible.

It is to be noted in regard to the surface leading to the oversize separator, which may be implemented as a sieve or a perforated metal sheet or as a wind sifter, among other things, that hot air flows through it, the air speed being selected in such a way that the particles float and oscillate over the surface and/or its openings. This prevents the particles from being able to agglutinate. In addition, the dwell time, during which the particles have air applied to them, is increased.

After the oversize separator, the particles may be supplied to a crystallizer, which is also operated using dry air guided in a loop. Reaction substances enriched in the air may then be separated in a spray loop in the way previously described and/or non-separable substances may be supplied to a heat transfer device.

A facility for producing spherical particles from a polymer melt, particularly made of polyfunctional carboxylic acids and alcohols, such as PET or PBT particles, of the type initially described is distinguished in that the nozzle device has a nozzle plate set into vibration and/or a nozzle plate having a vibration generator acting directly on the melt, with nozzles which are distributed on a circular area having a diameter $D_d$, and the fall tower is positioned in the loop which guides the air and has a diameter $D_f$ which is at least twice as large as the diameter $D_d$. The ratio of the diameter of the active area of the nozzle plate to the fall tower is particularly 1:2 to 1:10, particularly approximately 1:5.5. Furthermore, the fall tower is lined on the inside using an anti-adhesive material or has such a material. The material is particularly Teflon®.

In order to adjust the speed of the air which flows through the fall tower in counterflow to the falling direction of the droplets using constructively simple means, a refinement of the present invention provides that the fall tower has baffles which change the cross-section of the fall tower in the region of the air intake opening. These baffles may be, for example, conical or pyramidal stumps, which are coated on the outside with Teflon® or another suitable material which prevents adhesion.

The air outlet opening itself is positioned at a distance to the nozzle plate such that the particles dripped from the nozzle plate are subjected to an essentially laminar air flow directly after they exit the nozzle plate.

In the floor region of the fall tower, a slanted surface, such as a sieve or perforated plate, which has openings, is provided, which has dry air flowing through it in such a way that the particles may be moved floating and/or oscillating along the surface, at least in the region of the openings. The surface having the openings itself leads to an oversize separator, to which a crystallization stage operated using dry air is connected downstream.

Particle agglomerates separated in the oversize separator may be resupplied to the process via a line leading to the precondensation stage upstream from the nozzle plate.

Furthermore, the device includes a purification stage having a spray loop, which is connected to the first air loop, which includes the fall tower, and/or a second air loop, which includes the crystallization stage. Furthermore, connections originate from the purification stage to one of the esterification and/or reesterification stages before the precondensation stage and to a combustion device.

Further details, advantages, and features of the present invention result not only from the claims and the features to be drawn therefrom—alone and/or in combination—but also from a preferred exemplary embodiment to be drawn from the following description of the drawing.

Although the teaching according to the present invention is particularly intended for the dripping of polyester, there is to be no restriction of the teaching according to the present invention therefrom. Rather, it is generally applicable for polymers. Preferred materials may be drawn from U.S. Pat. No. 5,633,018, to whose disclosure reference is expressly made here.

The teaching according to the present invention is particularly also applicable for producing PET using esterification of ethylene glycol and PTA,
PET using reesterification of ethylene glycol and DMT (dimethyl terephthalate),
PBT using esterification of butane diol and PTA,
PBT using reesterification of butane diol and DMT.

Furthermore, there is the possibility of adding a catalyst in the form of the compound based on titanium oxide to the starting product, in order to increase the polycondensation speed, without having to simultaneously accept that the pellets produced will have an undesired yellow color. This is because the production process according to the present invention occurs at relatively low temperatures in comparison to the related art.

In the single FIGURE, a facility layout for producing spherical particles from a polymer, particularly made of polyfunctional carboxylic acids and alcohols, particularly for producing spherical PET (polyethylene terephthalate) pellets is illustrated, purely as an example. In order to produce spherical pellets, from a paste preparation stage 10, an esterification stage 12 for terephthalic acid and ethylene glycol, and a subsequent pre-polycondensation stage 14, which has a partial vacuum applied to it, a polyester precondensate having a product temperature of approximately 260°–280° C. and an intrinsic viscosity of 0.1–0.4 is supplied via a heat exchanger 15 and a filter 16 to a nozzle plate

18, via which the well-filtered precondensate is dripped. If PBT pellets are produced, the polyester condensate has a product temperature between 210° C. and 240° C. and an intrinsic viscosity from 0.3 to 0.6.

The nozzle plate 18 may be set into vibration and particularly has outlet openings arranged in concentric circles, which have an area having a diameter $D_d$ of, for example, 300 mm. The nozzle plate 18 having the openings and/or nozzles may be inserted elastically in a holder, the nozzle plate itself being connected to a vibration exciter. The vibration exciter, which is to be an electromagnetic vibration exciter, is based on a load-bearing structure, in order to be able to vibrate the nozzle plate. Frequencies at which the nozzle plate may be set into vibration may lie in the range between 200 and 2000 Hz. The diameter of the openings and/or nozzles is to lie in the range between 0.2 and 0.8 mm. Furthermore, the polyester precondensate is to be supplied to the nozzle plate 18 at an overpressure of, for temple, 0.2 to 1.0 bar. The nozzle plate 18 is also uniformly heated, a temperature in the magnitude between 220 and 250°—for PBT between 190° C. and 220° C.—particularly being selected.

As an alternative or supplement, the melt may be excited to vibration using a vibration exciter for dripping.

By setting the nozzle plate 18 into vibration, it is ensured that the molten prepolymer is uniformly dripped in identically large and identically shaped particles and a fall tower 20, which is equivalent to a Prill tower. The length of the fall tower 20 may lie in the range between 10 and 30 meters, particularly in the range of 20 meters. Of course, tower heights of more than 30 meters are also technically possible. At a diameter $D_d$ of the active surface of the nozzle plate 18 of approximately 300 mm, the fall tower 20 is to have a diameter of 1600 mm. Furthermore, the fall tower 20 is to be lined on the inside with an anti-adhesive agent, particularly Teflon®, and/or be made of this material, in order to ensure that droplets leaving the nozzle plate 18 are not able to adhere.

Through the vibration excitation of the nozzle plate 18 and/or direct vibration excitation of the melt and the uniform distribution of the nozzles on the circular area, it is ensured that the droplets fall without colliding in the fall tower 20 via a path in which hardening of the surface of the droplets occurs to an extent such that agglomeration of droplets is prevented. Simultaneously, a spherical shape results due to the cohesion forces.

Furthermore, to avoid collisions, it is provided that the droplets in the fall tower 20 fall in an essentially laminar portion of an air flow, which runs in counterflow to the falling direction of the droplets, directly after leaving the nozzle plate 18. This air counterflow is used for further solidification of the spheres and their precrystallization, the flow speed of the particles which are falling and/or floating downward being adjusted as a function of their diameter.

There are air intake openings 22, 24 in the floor region of the fall tower 20 and, at a distance to the nozzle plate 18, an air outlet opening 27 to generate the counterflow.

Furthermore, there are baffles 26, of conical or conical stump geometry, for example, which change the cross-section, located in the floor region of the fall tower 20, through which the flow speed in the floor region of the fall tower 20 is increased in comparison to the head region, with the consequence that the dwell time of the droplets reaching the floor region, which are precrystallized and/or prehardened, is increased. Through the baffles 26, the airspeed in the floor region may be set to a speed between 3 and 7 m per second. The baffles 26 themselves are to at least have an anti-adhesive material such as Teflon® on the outside or be made of such a material.

Furthermore, the air flowing in via the air intake openings 22, 24 in the floor region, which flows against the falling particles, has a starting temperature between 80° C. and 160° C.—for PBT between 60° C. and 120° C.—the air temperature in the intake to lie above the glass transition point of the precondensate (approximately 70° C.–80° C. for PET and 35° C.–50° C. for PBT). A temperature of 160° C. for PET and/or 120° C. for PBT is not, however, to be exceeded, in order to avoid oxidative damage to the particles, adequate solidification and/or precrystallization nonetheless to be ensured simultaneously. The entering air is also to have a low dew point upon entering the fall tower 20, preferably between −10° C. and −40° C., for absorbing ethylene glycol, water, etc.

A slanted surface 30, in the form of a sieve or a perforated metal sheet, for example, which has passages 28, runs in the floor region of the fall tower 20. One of the air intake openings, in the exemplary embodiment the air intake opening 24, discharges into the space between the floor 32 of the fall tower 20 and the slanted surface 30. The speed of the dry air 24 flowing through the openings 28 is selected so that the particles reaching the floor 30 float and/or oscillate at least in the region of the openings 28. These measures also hinder agglutination of particles. Simultaneously, the dwell time of the particles in the fall tower 20 through which the air flows is increased.

Via the slanted surface 30, which is used as a quasi-transport device, the particles and/or pellets reach an oversize separator 34, through which the agglomerates are separated from the particles, in order to be resupplied to the precondensation stage 14 via a line 36. Due to the slight viscosity which they still have, possibly occurring agglomerates may be dissolved without problems in the precondensation stage 14 and may thus be resupplied to the process.

The pellets are supplied to a crystallization stage 38, which is also operated using dry air, from the oversize separator 34 and/or its funnel-shaped floor region 36. From the crystallization stage 38, the particles may reach a typical SSP polycondensation stage, which is particularly operated under partial vacuum.

At the schematic illustration of the single FIGURE indicates, the air permeating the fall tower 20 is conveyed in a—first—loop 40, the intake openings 22, 24 having flaps 42, 44 connected upstream for air quantity regulation. Furthermore, there is a fan 46 before the control flaps 42, 44.

The air removed via the outlet opening 27 is charged with reaction products such as ethylene glycol and/or butane diol, water, oligomers, or acetaldehyde and/or tetrahydrofuran, which arise from the dripped precondensate and/or molten prepolymer. In order to resupply the reaction products, if they are reusable, to the production process, a portion from the loop 40 is supplied via a line 48 to a—second—loop 50, a spray loop, which includes a spray condenser 52, in which fresh and cold ethylene glycol and/or butane diol, which is supplied via a line 54, is sprayed via a spray device 56. Through this measure, reaction substances such as ethylene glycol, butane diol, oligomers, water, etc., are condensed out of the loop 50, and may be reused as raw materials and supplied to the esterification and/or reesterification stage 12 via a line 58. To accelerate the condensation, there is a heat exchanger 60 in the loop 50, through which the temperature of the air flowing through the loop 50 may be adjusted optimally. There is a pump 62 to convey the loop liquid itself.

The proportion of air transferred out of the first loop 40 is preferably between 10% and 30%.

The air which leads the spray loop 50 via a line 64 is purified and has a low dew point and may be supplied to the loop 40 flowing through the fall tower 20 via a line 66. Due to the low temperature of the air leaving the spray loop 50 via the line 66 and its low dew point, the temperature in the loop 50 is adjusted to a desired intake temperature in the floor region of the fall tower 20.

Since small quantities of acetaldehyde and/or THF (tetrahydrofuran), which are not able to be condensed in the spray loop 50, are formed both in the fall tower 20 and in the downstream precrystallization stage 38, small quantities of air are supplied to the first loop 40 via a connection 68. An identical quantity of air is removed from a line 64, which connects the spray loop 50 with the loop 40 of the fall tower 20 and/or a third loop 70 including the precrystallization stage 38, via a connection 72, in order to be mixed into a heat transfer facility for the purpose of combustion, through which the requirement for external energy such as heating gas and/or oil may be. reduced.

As mentioned, the precrystallization stage 38, which is particularly necessary for the processing of comonomers, also includes a loop 70, in which dry air is conveyed using a fan 74. The air flowing in the loop 70 may also be heated to the desired extent via a heating device 76. As shown in the drawing, the loop 70 is connected via a line 78 to the spray loop 50, in order to be able to condense out reaction substances with which the circulating air is enriched and resupply them to the esterification and/or reesterification process.

A quantity of air, having a low dew point, corresponding to the quantity of air removed via the line 78 is resupplied via the line 64 to the loop 70.

The removal of reaction substances from the loop 70 is advantageous for economic reasons alone, since due to their relatively low intrinsic viscosities, a relatively large amount of ethylene glycol and/or butane diol is still in the air loop 70, so that, as mentioned, condensing out ethylene glycol and/or butane diol and returning them to the esterification and/or reesterification stage 12 suggests itself.

The following is to be noted in regard to the temperatures of the particles and/or the air loops permeating the fall tower 20. The particles leave the nozzle plate at the temperature of approximately 230° for the PET process and/or 190° for the PBT process and reach a temperature of approximately 180° in the middle region of the fall tower 20. A temperature of approximately 160° C. for the PET process and/or 130° C. for the PBT process exists in the oversize separator 34.

The quantity and temperature of air entering the fall tower 20 via the intake openings 22, 24 is adjusted according to the throughput. The air removed from outlet opening 27 has a temperature of approximately ≦160° C. for a PET process and ≦130° C. for a PBT process. In the second loop 50, which includes the spray purification, the air is cooled to approximately 20° and is supplied at this temperature to both the first loop 40 and the second 70.

The air supplied underneath the slanted surface 30, which exercises the function of a fluidized bed, via the intake opening 24 is to be supplied at a temperature at which the crystallization speed for the pellets to be produced is optimal. This means approximately 160° C. for the production of PET spheres and ≦130° C. for PBT pellets. The air supplied via the opening 22 above the surface 30 is to be below the temperatures indicated previously, since it is heated through heat transfer from the falling droplets as it flows through the tower 20. In order to perform an optimization in this regard, a connection 67 leads from the line 64, which comes from the spray loop 50, to the tower, via which purified air of relatively low temperature (approximately 20–30° C.) is introduced directly into the tower 20, through which the temperature of air flowing through the tower 20 is reduced overall. Therefore, air of a desired relatively high temperature may be supplied in the region of the fluidized bed 30, without the optimum crystallization temperature being exceeded inside the tower 20, since cooler air is mixed in via the line 67, as described.

Using the method according to the present invention, uniform spherical pellets which lie in a narrow grain spectrum may be produced. Spherical pellets having a diameter of 0.8 millimeters may be obtained at a nozzle diameter of 0.5 mm, a nozzle plate frequency of 1000–2000 Hz, and a fall height of 20 meters.

What is claimed:

1. A method of producing spherical particles from a polymer melt, made of polyfunctional carboxylic acids and alcohols, including PET or PBT pellets, a molten prepolymer and/or precondensate and/or non-stringy polymer being dripped into droplets using a drip nozzle, the droplets having a gas applied to them such that the droplets in the fall tower fall in an essentially laminar portion of the air flow, which runs in counter flow to the falling direction of the droplets, directly after leaving the nozzle part for at least partial crystallization and then being transported to a further postcrystallization stage, characterized in that the molten polymer is dripped using a nozzle plate set into vibration and/or through direct vibration excitation of the molten prepolymer and/or polymer and the droplets thus formed have air applied to them as the gas in counterflow, the air being supplied to the fall tower at a temperature $T_1 \leq 160°$ C., which lies above the glass transition point of the prepolymer and/or polymer melt to be dripped and the air is heated to a temperature $T_2 \leq 210°$ C. through thermal transfer from the droplets.

2. The method according to claim 1, characterized in that, for the production of PET pellets, the air is supplied to the fall tower at a temperature such that the air is heated to at most a temperature $T_2 \leq 160°$ C. through thermal transfer from the droplets.

3. The method according to claim 1, characterized in that, for the production of PBT pellets, the air is supplied to the fall tower at a temperature such that the air is heated to at most a temperature $T_2 \leq 140°$ C. through thermal transfer from the droplets.

4. The method according to claim 1, characterized in that, for the production of the prepolymer and/or precondensate, a catalyst based on titanium oxide, which increases the polycondensation speed, is added to the polymer melt.

5. The method according to claim 1, characterized in that the air is supplied to the fall tower in its lower region.

6. The method according to claim 1, characterized in that the air flows against the droplets in the lower region of the fall tower at a higher speed than in the upper region.

7. The method according to claim 1 characterized in that the fall tower is supplied air having a dew point temperature $T_t$ wherein $-10°$ C. $\leq T_t \leq -40°$ C.

8. The method according to claim 1, characterized in that the air is guided in a first loop, which includes the fall tower, and a part of the air is removed from the first loop and supplied to a second loop, in which reaction substances including ethylene glycol and/or butane diol, oligomers, and/or water are removed.

9. The method according to claim 8, characterized in that the second loop is a spray loop, in which ethylene glycol and/or butane diol is sprayed, reaction substances condensed out in the second loop being supplied to an esterification or reesterification stage positioned upstream from the nozzle plate.

10. The method according to claim 9, characterized in that the air removed from the first and/or the second loop, having reaction products contained therein which are not condensable in the second loop, including acetaldehyde and/or tetrahydrofuran, is supplied to a heat transfer facility.

11. The method according to claim 1, characterized in that the at least partially crystallized droplets are removed from the fall tower in the floor region of the fall tower via a slanted surface having openings which dry air flows through.

12. The method according to claim 11, characterized in that the droplets, which are at least partially crystallized into the spheres, are transported floating and/or oscillating along the slanted surface and/or at least in the region of the openings present therein.

13. The method according to claim 11, characterized in that the droplets, which are at least partially crystallized into the spheres, are classified after leaving the slanted surface.

14. The method according to claim 11, characterized in that the droplets, which are at least partially crystallized into the spheres, reach an oversize separator from the slanted surface and particles separated there are supplied to a precondensation stage for the prepolymer.

15. The method according to claim 14, characterized in that the particles are supplied to a precrystallization stage, which is positioned in a third loop which dry air flows through, after passing through the oversize separator.

16. The method according to claim 15, characterized in that a portion of the dry air is supplied to the second loop from the third loop, which includes the crystallization stage.

17. A facility for producing spherical particles from polymer, made of polyfunctional carboxylic acids and alcohols, for producing PET or PBT pellets, including at least one nozzle device, which drips a molten prepolymer and/or polymer, a fall tower (20), positioned downstream thereto, which is positioned in an air loop (40) via at least one air intake opening at the floor and at least one outlet opening at the nozzle device, a transport device, positioned downstream from the fall tower, for the spherical particles at least precrystallized in the fall tower, and a crystallization stage, positioned downstream from the transport device, characterized in that the facility has a vibration exciter and a nozzle plate having nozzles which are distributed on an area wherein the nozzle device and/or the molten prepolymer and/or polymer may be excited to vibration directly via the vibration exciter, and the fall tower has a cross-section which is at least twice as large as the area and is positioned in the loop which guides the air such that directly after leaving the nozzle device, droplets in the fall tower fall in an essentially laminar portion of the air flow running counter to the falling direction of the droplets.

18. The facility according to claim 17, characterized in that the nozzles of the nozzle plate are distributed on an area which corresponds to ¼ or ⅓ of the cross-section of the fall tower.

19. The facility according to claim 17, characterized in that the nozzles are distributed on a circular area having a diameter $D_d$, the fall tower has a circular cross-section having a diameter $D_f$, and $1.5\ D_d \leqq D_f$.

20. The facility according to claim 17, characterized in that the nozzle plate and/or the molten prepolymer and/or polymer may be excited to vibration directly via the vibration exciter.

21. The facility according to claim 18, characterized in that the diameter of the area formed by the nozzles of the nozzle plate has a ratio to the diameter of the fall tower $D_d:D_f$ of approximately 1:2 to 1:10.

22. The facility according to claim 17, characterized in that at least one device which increases the air intake speed is positioned in the fall tower in the region of its air intake opening.

23. The facility according to claim 17, characterized in that the air outlet opening runs at a distance to the nozzle plate such that the particles dripped from the nozzle plate are subjected to an essentially laminar airflow directly after exiting the nozzle plate.

24. The facility according to claim 17, characterized in that the transport device positioned in the floor region of the fall tower has a slanted surface, including a sieve or perforated plate, having openings which are permeated by dry air so that the particles may be moved floating and/or oscillating along the surface.

25. The facility according to claim 24, characterized in that the slanted surface (30) runs at a distance to the floor of the fall tower (20), and a first air intake opening is provided between the floor and the slanted surface and a second air intake opening of the air loop is provided above the slanted surface.

26. The facility according to claim 24, characterized in that the slanted surface has an oversize separator positioned downstream, from which a crystallization stage operated using dry air is positioned downstream.

27. The facility according to claim 26, characterized in that a line which guides oversize particles separated by the oversize separator leads to a precondensation stage positioned upstream from the nozzle plate.

28. The facility according to claim 17, characterized in that a part of the air from the first loop, which includes the fall tower, may be supplied via a line to a purification stage forming a second loop.

29. The facility according to claim 28, characterized in that the purification stage, a spray loop as the second loop, is connected via a line to an esterification stage positioned upstream from the nozzle plate.

30. The facility according to claim 28, characterized in that a portion of the air having non-condensable substances may be supplied from the second loop to a heat transfer device via a line.

31. The facility according to claim 28, characterized in that the crystallization stage is positioned in a third loop, which dry air flows through, connected to the second loop.

32. The facility according to claim 28, characterized in that the second loop is connected via a line to the air intake openings or directly to the fall tower above the air intake opening above the device.

33. The method according to claim 8, characterized in that the air removed from the first and/or the second loop, having reaction products contained therein which are not condensable in the second loop, including acetaldehyde and/or tetrahydrofuran, is supplied to a heat transfer facility.

34. A method of producing spherical particles from a polymer melt, made of polyfunctional carboxylic acids and alcohols, including PET or PBT pellets, a molten prepolymer and/or precondensate and/or non-stringy molten polymer being dripped into droplets using a vibration exciter and a nozzle device having nozzles which are distributed on an area wherein the nozzle device and/or the molten prepolymer and/or polymer may be excited to vibration directly via the vibration exciter, wherein said droplets enter a fall tower having a cross-section which is at least twice as large as the area and positioned downstream of the nozzle device in a loop which guides the air, wherein air is applied to the droplets in counter flow to the falling direction of the droplets such that the droplets in the fall tower fall in an essentially laminar portion of the air flow and the droplets undergo at least partial crystallization before being transported to a further post-crystallization stage and the air being, wherein said air supplied to the fall tower is at a temperature $T_1 \leqq 160°$ C., which lies above the glass transition point of the prepolymer and/or polymer melt to be dripped and the air being supplied to the fall tower is at a temperature such that the air is supplied to the fall tower and the air is heated to at most a temperature $T_2 \leqq 210°$ C. through thermal transfer from the droplets.

* * * * *